UNITED STATES PATENT OFFICE 2,491,414

COMPOSITIONS OF 2.2-DI-(HALO-PHENYL)-1.1.1-TRICHLORO-ETHANES AND 2.4-DI-NITRO-PHENOL COMPOUNDS

George E. Lynn and Curtis E. Dieter, Midland, Mich., assignors to The Dow Chemical Company, Midland, Mich., a corporation of Delaware No Drawing. Application February 10, 1945, Serial No. 577,326

11 Claims. (Cl. 167—30)

This invention relates to insecticides and is particularly directed to a novel composition adapted to be employed for the control of insect and mite pests.

Recent developments in the field of synthetic organic parasiticides have been high-lighted by the discovery of the insecticidal properties of 2.2-di-(4-chlorophenyl)-1.1.1 - trichloro - ethane. This compound has been found to be effective against a wide range of agricultural and household insect pests. However, the new toxicant retains the specificity of action characterizing most organic parasiticides and has little if any effect against a number of common and economically important insect and mite organisms. This specificity of action threatens materially to limit the use of the new toxicant, particularly where its application kills natural predators and parasites but not the primary pest organism. In such siutation the population of the primary pest frequently builds up to such a degree that the ultimate damage to the crop is much greater than would have occurred in the absence of control measures.

It is among the objects of the present invention to provide toxicant mixtures of 2.2-di-(halophenyl)-1.1.1-trichloro-ethanes with other toxic compounds, which mixtures will be toxic to a wider range of common agricultural pests than the 2.2-di-(halo-phenyl)-1.1.1-trichloro-ethanes alone. A further object is to supply a mixture of mutually activating toxicants, such mixture displaying a synergistic action as regards effectiveness against insect and mite pests. Other objects of the invention will become apparent from the following description and examples.

According to the present invention, 2.2-di-(halo-phenyl)-1.1.1-trichloro-ethanes are employed in combination with a 2.4-dinitro-phenol or a salt of a 2.4-dinitro-phenol to obtain improved toxicant mixtures. When compounded in standard type parasiticidal compositions, these mixtures exert a toxicity against insects and mites which is greater than additive with respect to that shown by the constituent parts of the mixtures in equivalent amounts.

In carrying out the invention, the 2.2-di-(halophenyl)-1.1.1-trichloro-ethane and dinitrophenol compound may be mixed together in any suitable manner to form a concentrate adapted to be subsequently diluted and employed as either a spray or dust. The exact proportions of materials employed vary with the particular toxicants selected, the parasite to be controlled, the tolerance of the host plant for the toxicant mixture, the form in which the toxicant mixture is to be applied, and the conditions under which such application is to be made. While any suitable amounts may be employed, good results have been obtained when using from 0.5 to 8 parts by weight of the 2.2-di-(halo-phenyl)-1.1.1 - trichloro - ethane for each part by weight of the dinitro compound. Any operable concentration of the mixture of toxicants may be applied for pest control with from about 0.001 to 3 per cent by weight in spray compositions and from about 0.5 to 5 per cent in dust mixtures being satisfactory in most instances.

The toxicant mixtures may be compounded with various inert carriers such as diatomaceous earth, bentonite, talc, sulfur, wood flour, inorganic phosphates, gypsum, or lime to form agricultural dusts adapted to be applied in standard dusting equipment. If desired, such dusts may be employed as concentrates and subsequently dispersed in water or other liquid carriers to form sprays. The toxicant mixtures may also be incorporated with various wetting, dispersing, and sticking agents to form compositions adapted to be further diluted to produce dusts or spray materials. In the preparation of such concentrates, as distinguished from finished dusts and sprays, from about 5 to 95 per cent by weight of the toxicant mixture is commonly employed.

In other embodiments of the invention, the mixture of toxicants may be dispersed in water-oil emulsions or employed in water suspension with or without the addition of emulsifying, wetting, or dispersing agents. Similarly, the mixture may be used in combination with such materials as inorganic pigments, organic dyes, and conventional insecticide and fungicide products.

A preferred mode of operation comprises the addition of a concentrate of the 2.2-di-(halophenyl)-1.1.1-trichloro-ethane compound and a concentrate of the dinitrophenol compound separately to a given amount of water to produce a spray mixture. The concentrates so employed may consist of from 5 to 50 per cent or higher of toxicant dispersed on a suitable finely divided solid carrier and including an adequate wetting and dispersing agent. By operating in this fashion, the exact proportions of the 1.1.1-trichloro-ethane derivative and dinitro compound can be regulated so as to permit modification of the ultimate composition to fit the needs of any particular situation. A further advantage in such operation is that the possibilities for reaction between the several components of the concentrates are minimized.

The preferred 1.1.1-trichloro-ethane derivative is the compound 2.2-di-(4-chloro-phenyl)-1.1.1-trichloro-ethane. Preferred dinitro-phenolic toxicants are 2.4-dinitro-6-cyclohexyl-phenol, 2.4-dinitro-6-alkyl-phenols, and the difficultly water-soluble amine salts of these phenols.

The several examples are illustrative with respect to the particular compounds, compound mixtures, and concentrations employed, but are not to be construed as limiting the invention.

*Example 1*

10 parts by weight of 2.2-di-(4-chloro-phenyl)-1.1.1-trichloro-ethane, 1 part of sodium lauryl sulfate, 5 parts of bentonite, and 84 parts of finely divided gypsum were ground and mixed together to produce an insecticide concentrate, hereafter referred to as concentrate "A."

In a similar manner, 40 parts by weight of 2.4-dinitro-6-cyclohexyl-phenol, 40 parts of bentonite, 19 parts of finely ground soya-bean flour, and 1 part of sodium lauryl sulfate were ground together to produce an insecticide mixture, identified as concentrate "B."

Amounts of concentrate "A" and of concentrate "B" were dispersed in water to give a composition containing 0.25 pound each of 2.2-di-(4-chloro-phenyl)-1.1.1-trichloro-ethane and 2.4-dinitro-6-cyclohexyl-phenol per 100 gallons. This product was sprayed on snapdragons infested with peach aphids to obtain a 92 per cent control of the organism. A spray containing sufficient of concentrate "A" to give 0.25 pound of 2.2-di-(4-chloro-phenyl)-1.1.1-trichloro-ethane alone per 100 gallons controlled 53 per cent of the aphids. A spray containing 0.25 pound of 2.4-dinitro-6-cyclohexyl-phenol (supplied as concentrate "B") per 100 gallons gave 0 per cent control of the aphids.

In a similar operation, the amounts of concentrates "A" and "B" were so regulated that the ultimate concentrations of the 2.2-di-(4-chloro-phenyl)-1.1.1-trichloro-ethane and 2.4-dinitro-6-cyclohexyl-phenol, in the ultimate spray composition, were 0.125 pound per 100 gallons. This composition gave 52 per cent control of the peach aphids. Concentrate "A" alone in amount to give 0.125 pound of 2.2-di-(4-chloro-phenyl)-1.1.1-trichloro-ethane controlled only 17 per cent of the organisms. An analogous composition comprising the 2.4-dinitro-6-cyclohexyl-phenyl (concentrate "B") alone gave 0 per cent control of the aphids.

*Example 2*

Concentrate "A," as disclosed in Example 1, was employed in combination with a concentrate "C," produced by grinding together 20 parts by weight of dicyclohexylamine salt of 2.4-dinitro-6-cyclohexyl-phenol, 74 parts of finely divided gypsum, 5 parts of bentonite, and 1 part of sodium lauryl sulfate. Such amounts of concentrates "A" and "C" were dispersed in water that the ultimate spray comprised 0.25 pound portions of the 2.2-di-(4-chloro-phenyl)-1.1.1-trichloro-ethane and dicyclohexylamine salt of 2.4-dinitro-6-cyclohexyl-phenol per 100 gallons. Against peach aphid, this composition gave 53 per cent control. An analogous spray mixture containing composition "C" alone in amount to give 0.25 pound of the amine salt toxicant per 100 gallons, gave 0 per cent control.

In a similar determination, a spray in which the amounts of the concentrates were adjusted so as to give but 0.125 pound of each of the toxicants per 100 gallons was applied to snapdragons and found to give 45 per cent control of the peach aphids. Sprays containing the individual toxicants at 0.125 pound per 100 gallons gave controls of 17 per cent and 0 per cent, respectively, for 2.2-di-(4-chloro-phenyl)-1.1.1-trichloro-ethane and dicyclohexylamine salt of 2.4-dinitro-6-cyclohexyl-phenol.

*Example 3*

40 parts by weight of 2.2-di-(4-chloro-phenyl)-1.1.1-trichloro-ethane, 1 part of sodium lauryl sulfate, 5 parts of tri-calcium phosphate, and 54 parts of finely divided gypsum were ground together and mixed to obtain an insecticide concentrate, hereafter referred to as concentrate "D." The latter concentrate and concentrate "C," as described in Example 2, were dispersed in water in such quantity as to form a spray composition containing 0.5 pound each of 2.2-di-(4-chloro-phenyl)-1.1.1-trichloro-ethane and dicyclohexylamine salt of 2.4.-dinitro-6-cyclohexyl-phenol per 100 gallons. This mixture was sprayed on cranberry bean plants infested with third instar larvae of Mexican bean beetle. It was found that the feeding by the insects was limited to 50 per cent and that a 60 per cent kill of the test organisms was obtained.

Sprays containing concentrates "D" and "C" separately, in amount to provide a 0.5 pound portion of toxicant per 100 gallons, permitted 95 per cent feeding by the beetle larvae and gave 0 per cent kill.

*Example 4*

Concentrates "C" and "D" were mixed with water substantially as described in Example 3 to obtain a spray mixture containing 0.25 pound each of 2.2-di-(4-chloro-phenyl)-1.1.1-trichloro-ethane and dicyclohexylamine salt of 2.4-dinitro-6-cyclohexyl-phenol per 100 gallons. This product was applied to cranberry bean plants heavily infested with greenhouse red spider. 100 per cent control of the spider was obtained. A control spray containing concentrate "D" in amount to give 0.25 pound of 2.2-di-(4-chloro-phenyl)-1.1.1-trichloro-ethane per 100 gallons gave only 7 per cent control of the red spider. A control composition containing a corresponding amount of dicyclohexylamine salt of 2.4-dinitro-6-cyclohexyl-phenol gave 75 per cent control of the infesting organism.

A similar determination was carried out in which the amount of the toxicants were restricted to 0.125 pound of each per 100 gallons of spray mixture. This resulted in a 75 per cent kill of the greenhouse red spiders. Concentrate "D," in amount to give 0.125 pound per 100 gallons of the 2.2-di-(4-chloro-phenyl)-1.1.1-trichloro-ethane per 100 gallons, gave 0 per cent control of the organisms. Concentrate "C" in equivalent concentration gave 60 per cent control.

A third composition was prepared in which the amount of concentrate "D" was such as to give 0.5 pound of 2.2-di-(4-chloro-phenyl)-1.1.1-trichloro-ethane per 100 gallons of spray mixture and the amount of concentrate "C" sufficient to give 0.125 pound of dicyclohexylamine salt of 2.4-dinitro-6-cyclohexyl-phenol per 100 gallons. This spray was applied for control of greenhouse red spider on cranberry beans substantially as described. A 97 per cent kill was obtained. A control determination with a composition containing 0.5 pound of the 2.2-di-(halo-phenyl)-1.1.1-trichloro-ethane toxicant alone (supplied a concentrate "D") gave 27 per cent control. A control spray containing 0.125 pound of dicyclohexylamine salt of 2.4-dinitro-6-cyclohexyl-phenol (supplied as concentrate "C") gave 56 per cent control.

*Example 5*

Other 2.2 - di-(halo - phenyl)-1.1.1-trichloro-ethanes adapted to be employed substantially as shown in the examples include 2.2-di-(2-chloro-phenyl)-1.1.1-trichloro-ethane, 2.2 - di - (2.4-dichloro-phenyl)-1.1.1-trichloro - ethane, 2.2 - di-(4-bromo-phenyl)-1.1.1-trichloro-ethane, 2.2-di-(4-iodo-phenyl)-1.1.1-trichloro-ethane, and the like. In place of 2.4-dinitro-6-cyclohexyl-phenol and its dicyclohexylamine salt, there may be substituted such compounds as 2.4-dinitro-6-methyl - phenol, 2.4 - dinitro-6-secondarybutyl-phenol, 2.4 - dinitro-6-normalbutyl - phenol, 2.4-dinitro-6-secondaryamyl-phenol, 2.4 - dinitro-6-ethyl - phenol, 2.4 - dinitro - 6-isopropyl-phenol, 2.4-dinitro - 6-benzyl-phenol, 2.4-dinitro-6-chloro-phenol, sodium 2.4-dinitro-6-cyclohexyl- phenolate, ethylene-diamine 2.4-dinitro-6-cyclohexyl-phenolate, biphenyl guanidine 2.4-dinitro-6-cyclohexyl-phenolate, calcium 2.4-dinitro-6-cyclohexyl-phenolate, laurylamine 2.4-dinitro-6-cyclohexyl-phenolate, sodium 2.4 - dinitro - 6-methyl-phenolate, di-secondarybutyl-amine 2.4-dinitro-6-methyl - phenolate, dicyclohexylamine 2.4-dinitro-6-secondarybutyl - phenolate, laurylamine 2.4-dinitro-6-secondarybutyl - phenolate, monocyclohexylamine 2.4-dinitro-6-benzyl-phenolate, etc.

We claim:

1. An insecticide composition comprising as active toxic ingredients a 2.2-di-(halo-phenyl)-1.1.1-trichloro-ethane and a member of the group consisting of the 2.4-dinitro-phenols and their salts, and wherein the mixture of toxicants exerts a synergistic effect as regards insecticidal toxicity.

2. An insecticide composition comprising as active toxic ingredients a 2.2-di-(chloro-phenyl)-1.1.1-trichloro-ethane and a member of the group consisting of the 2.4-dinitro-phenols and their salts, and wherein the mixture of toxicants exerts a synergistic effect as regards insecticidal toxicity.

3. An insecticide composition comprising as active toxic ingredients 2.2-di-(4-chloro-phenyl)-1.1.1-trichloro-ethane and a member of the group consisting of the 2.4-dinitro-phenols and their salts, and wherein the mixture of toxicants exerts a synergistic effect as regards insecticidal toxicity.

4. An insecticide composition comprising as active toxic ingredients 2.2-di-(4-chloro-phenyl)-1.1.1-trichloro-ethane and a 2.4-dinitro-phenol, and wherein the mixture of toxicants exerts a synergistic effect as regards insecticidal toxicity.

5. An insecticide composition comprising as active toxic ingredients 2.2-di-(4-chloro-phenyl)-1.1.1-trichloro-ethane and a salt of a 2.4-dinitro-phenol, and wherein the mixture of toxicants exerts a synergistic effect as regards insecticidal toxicity.

6. An insecticide composition comprising as active toxic ingredients 2.2-di-(4-chloro-phenyl)-1.1.1-trichloro-ethane and 2.4-dinitro-6-cyclohexyl-phenol, and wherein the mixture of toxicants exerts a synergistic effect as regards insecticidal toxicity.

7. An insecticide composition comprising as active toxic ingredients 2.2-di-(4-chloro-phenyl)-1.1.1-trichloro-ethane and the dicyclohexylamine salt of 2.4 - dinitro-6-cyclohexyl - phenol, and wherein the mixture of toxicants exerts a synergistic effect as regards insecticidal toxicity.

8. An insecticide composition comprising as an active toxicant a mixture of from 0.5 to 8 parts by weight of 2.2-di-(4-chloro-phenyl)-1.1.1-trichloro-ethane with one part by weight of a member of the group consisting of the 2.4-dinitro-phenols and their salts, and wherein the mixture of toxicants exerts a synergistic effect as regards insecticidal toxicity.

9. An aqueous spray composition comprising as an active toxicant at least 0.001 per cent by weight of a mixture of from 0.5 to 8 parts by weight of 2.2-di-(4-chloro-phenyl)-1.1.1-trichloro-ethane with one part by weight of a member of the group consisting of the 2.4-dinitro-phenols and their salts, and wherein the mixture of toxicants exerts a synergistic effect as regards insecticidal toxicity.

10. An aqueous spray composition comprising as an active toxicant at least 0.001 per cent by weight of a mixture of 2.2-di-(4-chloro-phenyl)-1.1.1-trichloro-ethane with the dicyclohexylamine salt of 2.4-dinitro-6-cyclohexyl-phenol and wherein the mixture of toxicants exerts a synergistic effect as regards insecticidal toxicity.

11. An aqueous spray composition comprising as an active toxicant at least 0.001 per cent by weight of a mixture of 2.2-di-(4-chloro-phenyl)-1.1.1-trichloro-ethane with 2.4-dinitro-6-cyclohexyl-phenol, and wherein the mixture of toxicants exerts a synergistic effect as regards insecticidal toxicity.

GEORGE E. LYNN.
CURTIS E. DIETER.

REFERENCES CITED

The following references are of record in the file of this patent:

UNITED STATES PATENTS

| Number | Name | Date |
|---|---|---|
| 2,145,259 | Heath | Jan. 31, 1939 |
| 2,191,421 | Boyce | Feb. 20, 1940 |
| 2,225,619 | Britton et al. | Dec. 24, 1940 |
| 2,329,074 | Muller | Sept. 7, 1943 |
| 2,378,309 | Lynn et al. | June 12, 1945 |

OTHER REFERENCES

Soap and Sanitary Chemicals, Jan. 1943, pages 95 and 96 by Roarck. (Copy in P. O. Library.)